C. M. RICHARDSON.
LAWN BORDER TRIMMER.
APPLICATION FILED APR. 12, 1916. RENEWED FEB. 27, 1918.
1,280,551.
Patented Oct. 1, 1918.
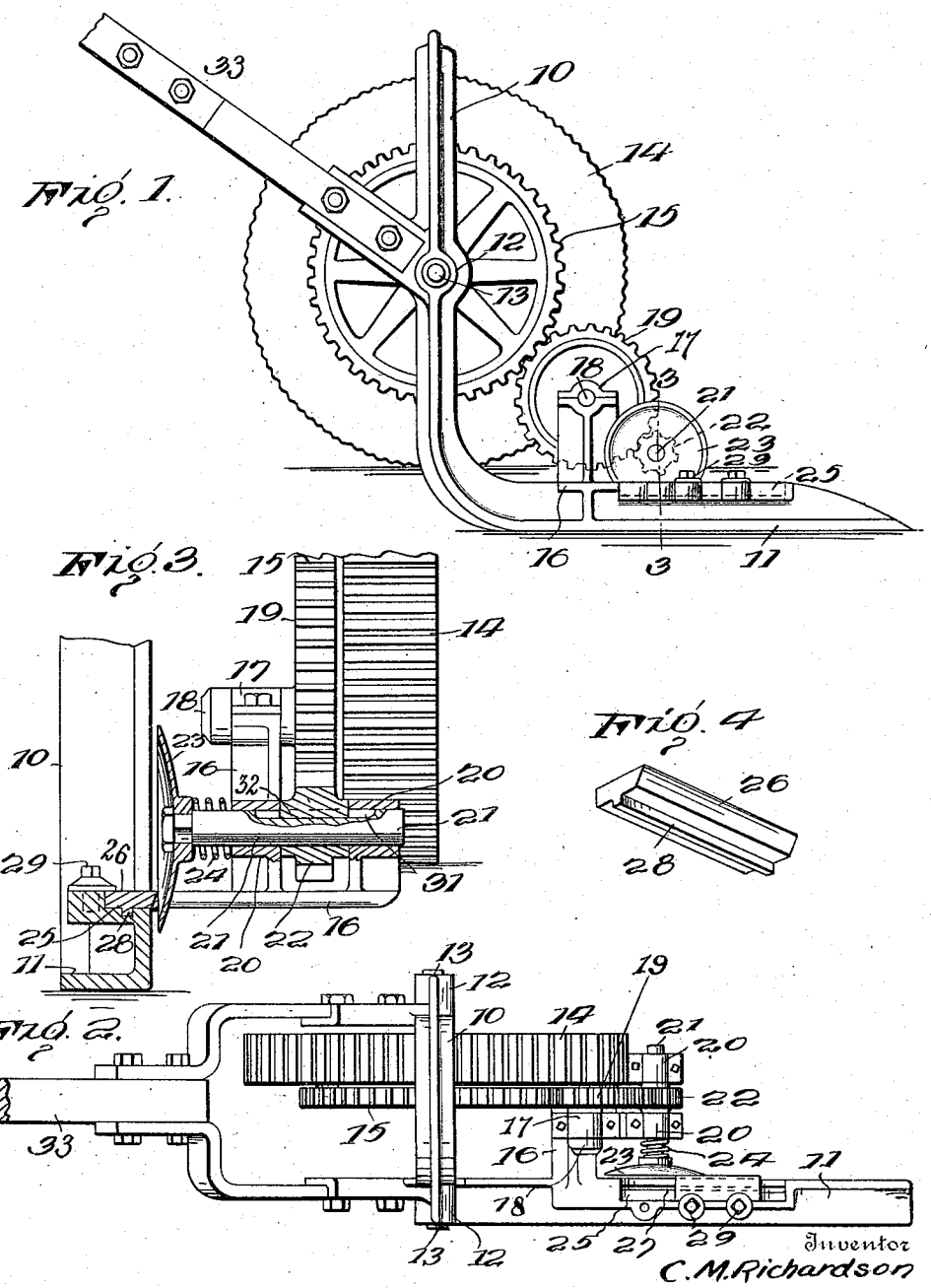
Inventor
C. M. Richardson
Witness
By
[signature], Attorneys

UNITED STATES PATENT OFFICE.

CLARENCE M. RICHARDSON, OF CLEVELAND, OHIO.

LAWN-BORDER TRIMMER.

1,280,551.     Specification of Letters Patent.      Patented Oct. 1, 1918.

Application filed April 12, 1916, Serial No. 90,738. Renewed February 27, 1918. Serial No. 219,538.

*To all whom it may concern:*

Be it known that I, CLARENCE M. RICHARDSON, a citizen of the United States, residing at Cleveland, in the county of Cuyahoga and State of Ohio, have invented certain new and useful Improvements in Lawn-Border Trimmers, of which the following is a specification.

This invention relates to improvements in devices for trimming the borders of lawns, and for like purposes, and has for one of its objects to improve the construction and increase the efficiency and utility of devices of this character.

Another object of the invention is to produce a device whereby a rotary cutter is utilized to form the edge of the lawn and to cut the grass and other growths to form a symmetrical edge to the lawn or park-way and to decrease the labor necessary to accomplish the desired results.

With these and other objects in view, the invention consists in certain novel features of construction, as hereinafter shown and described and then specifically pointed out in the claim; and in the drawings illustrative of the preferred embodiment of the invention—

Figure 1 is a side elevation of the improved device;

Fig. 2 is a plan view;

Fig. 3 is an enlarged sectional detail on the line 3—3 of Fig. 1;

Fig. 4 is a detached perspective view from beneath of the ledger member.

Corresponding and like parts are referred to in the following description and indicated in all the views of the drawings by the same reference characters.

The improved device comprises in general a supporting frame including a guiding shoe and having an operating handle, a rolling cutter for severing the grass, and a traction wheel carried by the frame and running upon the sod or grass adjacent to the path or walk and the motion of which is imparted to the rolling cutter as the machine is moved over the ground. The supporting frame includes a U-shaped upper portion 10 and a forwardly directed lower portion 11 which operates as a shoe to run upon the path or walk at the edge of the lawn to guide the device when running over the ground and also to elevate the overhanging grass which is to be cut and guide it to the severing device. The portion 10 of the frame is provided with bearings 12 in which a transverse shaft 13 is mounted for rotation and carrying a traction wheel or drum 14, the face of the latter being serrated or provided with small transverse ribs and channels in the same manner as the wheels of an ordinary lawn-mower, to increase the traction between the wheel and the ground. A relatively large gear 15 is connected to the traction wheel or drum 14 and partakes of its motion.

Extending from the shoe portion 11 of the frame is a lateral frame, represented as a whole at 16, and having a bearing 17 at its upper end to support a stub shaft 18 which carries a relatively small gear 19 in constant engagement with the larger gear 15. The frame extension 16 is likewise provided with a forked forward portion carrying bearings 20 spaced apart and supporting a countershaft 21 which carries a pinion 22 in constant engagement with the gear 19. The shaft 21 is slidable through the bearings 20 and the pinion 22, while at the same time partaking of the motion of the pinion 22. Any suitable means may be employed for transmitting the motion of the pinion 22 to the shaft, but for the purpose of illustration the shaft is shown in Fig. 3 provided with a channel or keyway 31 while the hub of the pinion 22 is provided with an inwardly directed rib 32 to engage in the channel.

Mounted upon the shaft 21 next to the shoe 11 is a cutting disk 23, and a spring 24 is located between the disk 23 and the adjacent bearing 20 and operates to maintain the cutting disk yieldably in its outer position, the object to be hereafter explained.

Formed in the upper face of the shoe 11 is a guideway 25 in which a ledger plate 26 is slidably disposed, the bottom of the guideway having a longitudinal channel 27 and the ledger plate 26 having a fin or rib 28 operating constantly in the channel. The upper face of the shoe 11 is provided with a plurality of threaded apertures to receive clamp bolts 29 having laterally directed heads to bear over the upper face of the ledger plate and thus clamp the latter in the guide-way. The ledger plate is of less length than the guide-way so that it can be adjusted longitudinally and clamped in any desired position by the bolts 29. The edge of the ledger plate next to the cutting disk 23 is beveled, as shown in Fig. 4 and operates constantly against the cutting edge of the disk, and serves as a self-sharpener to the disk. The cutting edge of the disk operates at one point only against the beveled edge of the ledger plate, and when the sharpened edge of the ledger plate is worn, the latter can be adjusted in the guide-way and thus bring an unimpaired portion of the ledger plate in contact with the cutting disk. By this means the "life" of the ledger plate is materially increased. A handle device of suitable construction and represented conventionally at 33 is connected to the frame, as shown.

The ledger plate 26 should be of harder tempered steel than the disk 23, so that the latter will be maintained in constant sharpened condition by contact with the ledger plate.

In operating the improved device the shoe portion 11 is moved over the ground at the edge of the lawn and beneath the overlapping grass which is thus elevated over the upper face of the shoe and is operated upon by the cutting disk 23, and the grass effectually and uniformly severed, thus producing a correspondingly uniform and even edge to the lawn.

The improved device operates quickly and accurately and likewise efficiently to produce a uniform edge to a lawn and with a marked decrease in labor and the saving of time, as the device operates as fast as a man can walk in pushing the implement.

The size of the gears should be so proportioned as to produce a very rapid rotation of the cutting disk, and the dimensions may be varied as required.

Having thus described the invention, what is claimed as new is:

An implement of the class described comprising a supporting frame including a bearing shoe, said shoe having a longitudinally directed seat opening laterally and upwardly, a ledger member shorter than the seat and engaging therein, said ledger member and seat having coacting guide rib and channel, means for adjusting said ledger member longitudinally in said seat, and a cutting member carried by said shoe and coacting with said ledger member.

In testimony whereof I affix my signature.

CLARENCE M. RICHARDSON. [L. S.]

Copies of this patent may be obtained for five cents each, by addressing the "Commissioner of Patents, Washington, D. C."